United States Patent
Cygnor et al.

[11] Patent Number: 6,007,311
[45] Date of Patent: Dec. 28, 1999

[54] HIGH SPEED SELF-LUBRICATED FUEL PUMP WITH HYDROSTATIC BEARINGS

[75] Inventors: John Edward Cygnor; Shin Katsumata; Jeff Clark Miller, all of Rockford, Ill.

[73] Assignee: Sundstrand Corporation, Rockford, Ill.

[21] Appl. No.: 08/970,850

[22] Filed: Nov. 14, 1997

[51] Int. Cl.[6] .................................................. F04B 35/00
[52] U.S. Cl. ............................................ 417/405; 415/211
[58] Field of Search .................................. 417/405, 409; 415/111, 112, 143, 201, 205

[56] References Cited

U.S. PATENT DOCUMENTS

| | | | |
|---|---|---|---|
| 3,650,580 | 3/1972 | Beisemann | 308/9 |
| 4,671,676 | 6/1987 | Chen et al. | 384/100 |
| 4,684,318 | 8/1987 | Mulders | 415/113 |
| 4,865,529 | 9/1989 | Sutton et al. | 417/409 |
| 5,022,228 | 6/1991 | Hoopes et al. | 60/734 |
| 5,061,151 | 10/1991 | Steiger | 415/106 |
| 5,310,265 | 5/1994 | Strangeland et al. | 384/100 |
| 5,456,574 | 10/1995 | Donnelly et al. | 415/28 |

FOREIGN PATENT DOCUMENTS

| | | |
|---|---|---|
| 0007409 | 6/1979 | European Pat. Off. . |
| 7409 | 6/1979 | European Pat. Off. . |
| 0382377 | 1/1990 | European Pat. Off. . |
| 382377 | 1/1990 | European Pat. Off. . |
| 0657651 | 11/1994 | European Pat. Off. . |
| 657651 | 11/1994 | European Pat. Off. . |
| 1653738 | 4/1972 | Germany . |
| 2312546 | 10/1974 | Germany . |

*Primary Examiner*—Charles G. Freay
*Assistant Examiner*—Robert Z. Evora
*Attorney, Agent, or Firm*—Wood, Phillips, VanSanten, Clark & Mortimer

[57] ABSTRACT

The weight and volume of a centrifugal fuel pump ideally suited for use in a fuel system for a turbine engine (12) may be reduced in a construction including a single shaft (10) mounting an inducing impeller (18), an impeller (22) for a regenerative pump, and an impeller (24) for a centrifugal volute pump. Hydrostatic bearings (26), (28) journal the shaft (10) within a pump housing (14) and are provided with fuel under pressure via a conduit (30) connected to the outlets of the regenerative pump and the centrifugal volute pump defined by the impellers (22) and (24), respectively.

12 Claims, 4 Drawing Sheets

6,007,311

HIGH SPEED SELF-LUBRICATED FUEL PUMP WITH HYDROSTATIC BEARINGS

FIELD OF THE INVENTION

This invention relates to pumps, and more particularly, to fuel pumps suitable for use in turbine powered aircraft.

BACKGROUND OF THE INVENTION

Modern aircraft engines require lightweight and highly reliable fuel pumping equipment. A lightweight pump reduces aircraft weight over that of an otherwise identical conventional pump, thereby increasing aircraft range and/or pay load. Moreover, in the usual case, the reduction in the weight of the pump will result in a reduction in it's volume as well. As a consequence, in the usual case a lightweight pump will fit in a smaller envelope which provides the aircraft designer with increased flexibility as well as the ability to progress towards a more slippery aerodynamic design. Consequently, aerodynamic drag may be reduced, further enhancing aircraft performance.

Centrifugal type fuel pumps address many of these demands. Unfortunately, their reliability is somewhat limited due to a relatively short fatigue life of oil-lubricated rolling elements such as ball bearings which must be designed to accommodate the high speeds involved as well as inherent critical speed considerations. Moreover, for obvious reasons, it is necessary to maintain lubricating oil and fuel streams completely separated. Conventionally, this is accomplished through the use of drained cavities within the pump that separate the pumping elements and the lubricated bearings. This in turn translates into the need for complex sealing systems as well as increased size. In the usual case, the axial length of the pump may be increased and the overhung moment is inevitably increased which increases the design complexity.

The present invention is directed to overcoming one or more of the above problems.

SUMMARY OF THE INVENTION

It is the principal object of the invention to provide a new and improved fuel pump that is ideally suited for use in modern aircraft. More particularly, it is an object of the invention to provide a high speed, self-lubricating fuel pump that is operational at rotational speeds typical of those encountered during the operation of a turbine engine to achieve a reduction in weight, volume and design complexity.

An exemplary embodiment of the invention achieves the foregoing objects in a high speed, self-lubricating fuel pump that is operable at rotational speeds in excess of 10,000 RPM and which includes a pump housing including a cavity. An inlet is provided to the cavity as well as an outlet from the cavity. A rotatable shaft is disposed in the housing and extends through the cavity. A pump impeller is mounted on the shaft to be rotatable therewith within the cavity and is operable to pump fuel within the cavity from the inlet to the outlet. A bore is located within the housing adjacent the cavity and snuggly receives the shaft. A plurality of angularly spaced pockets are disposed at the interface of the bore and the shaft and means are provided to connect the outlet of the cavity to each of the pockets to deliver fuel under pressure thereto when the impeller is rotating to thereby journal the shaft on a hydrostatic bearing.

In a preferred embodiment, the pockets are located in the housing and open radially inwardly toward the shaft.

The invention contemplates the use of a flow restriction for each of the pockets with each flow restriction located in the connecting means in close proximity to the associated pocket.

Preferably, the pockets are in multiple, axially spaced rows and are equally angularly spaced within each row.

In a preferred embodiment, the housing includes at least two pumping cavities and the rotatable shaft is a single shaft that extends through both of the cavities. There are two of the impellers, one in each cavity and the bearing defined by the pockets is located between the cavities.

In a highly preferred embodiment of the invention, one of the cavities and it's associated impeller define a centrifugal, volute pump while another of the impellers and it's associated cavity defines a regenerative pump.

A highly preferred embodiment of the invention contemplates still a further, third cavity within the housing together with an inducer impeller in the third cavity. The shaft has a free end that extends to the third cavity and mounts the inducer impeller for rotation therein. A second of the bearings is employed and is located in the housing to journal the shaft at a location to the side of both the first and second impellers that is remote from the inducer impeller.

Other objects and advantages will become apparent from the following specification taken in connection with the accompanying drawings.

DESCRIPTION OF THE PREFERRED EMBODIMENT

Figure 1:
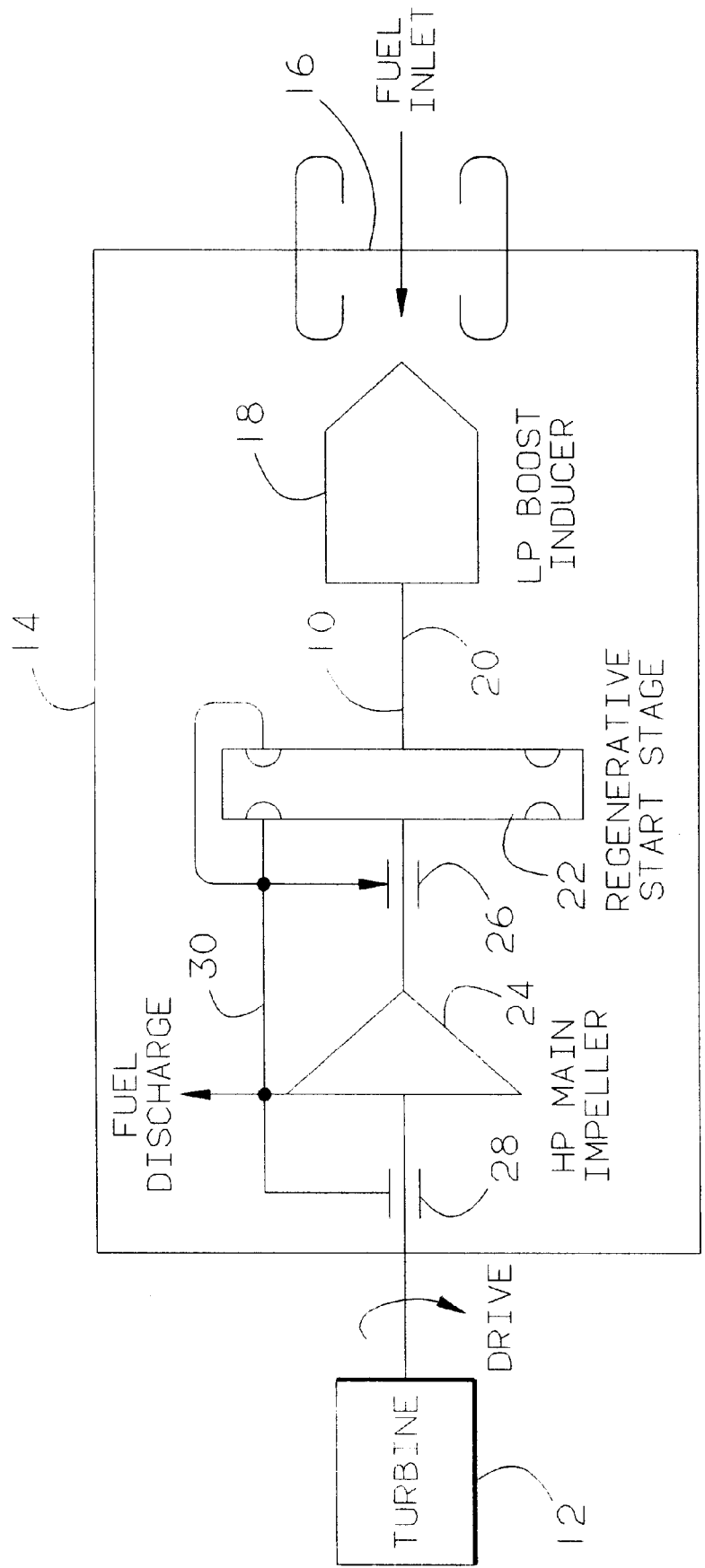
FIG. 1 is a mechanical schematic of a pump made according to the invention.
Figure 2:
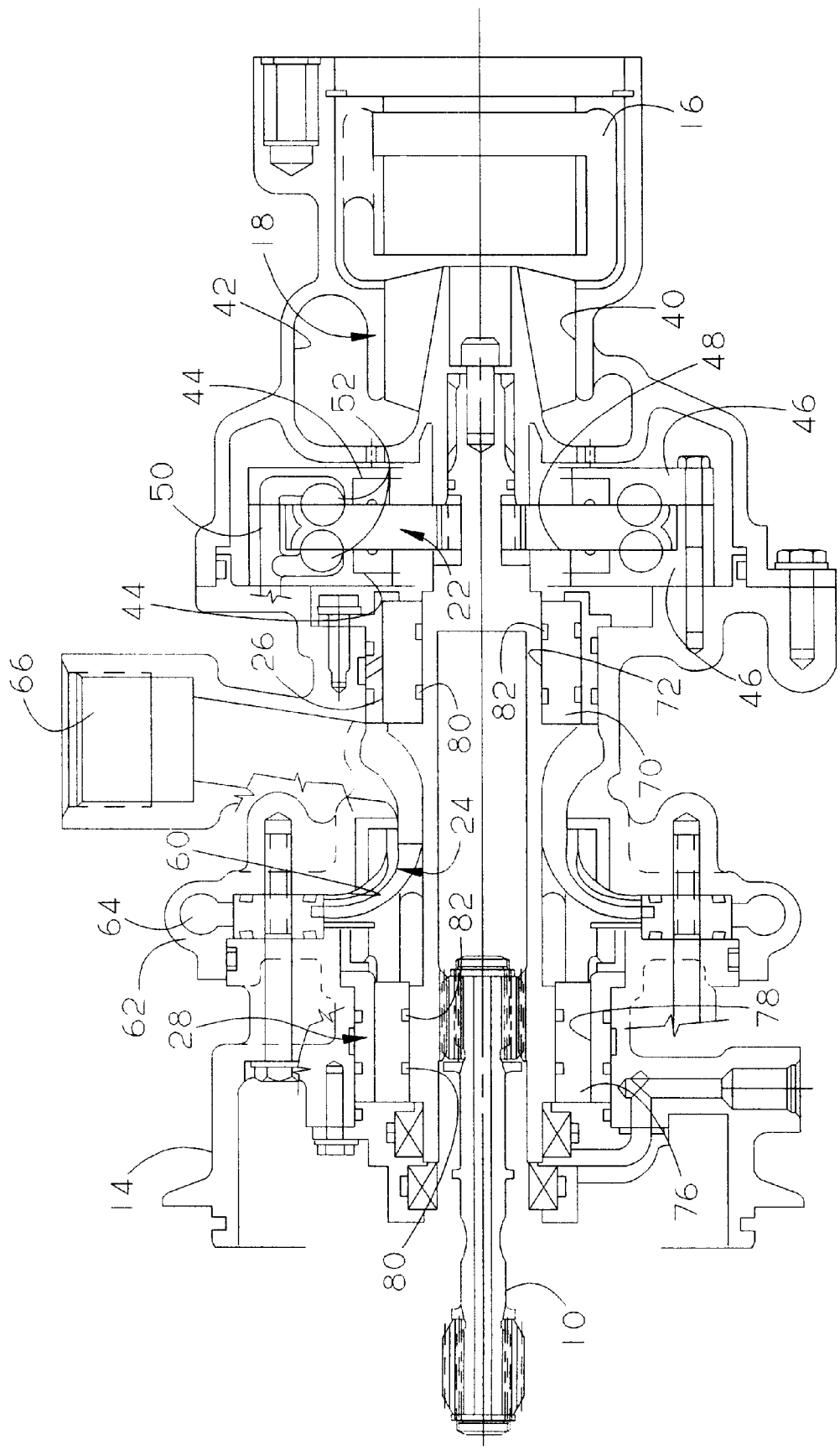
FIG. 2 is a sectional view of the pump.

An exemplary embodiment of a pump made according to the invention is illustrated in FIG. 1 and as will be apparent from the following description, includes multiple pump impellers. However, it is to be understood that the invention is applicable to pumps having as few as a single impeller. Principal applicability will be in those environments requiring a high speed pump of extended reliability, lightweight and low volume. Typically, pumps of this sort are required to attain rotational speeds in the range of 25,000–40,000 RPM and are used as fuel pumps for turbine engines. Referring to FIG. 1, the pump includes a shaft 10 which typically will be coupled to a turbine engine 12 which will drive it at the speeds mentioned above. The shaft 10 is rotatable within a housing 14 which includes a fuel inlet 16 to a low pressure boost inducer impeller 18 on one end 20 of the shaft 10. The end 20 is opposite the turbine 12.

Intermediate it's ends, the shaft 10 carries an impeller 22 for a regenerative pump. Located between the impeller 22 and the turbine 12, and within the housing 14 is the impeller 24 for a conventional centrifugal volute pump.

Hydrostatic bearings 26 and 28 located respectively between the impellers 22 and 24 and the impeller 24 and the turbine 12 journal the shaft 10 for rotation within the housing 14. The outlets of the pumps defined by the regenerative impeller 22 and the centrifugal volute impeller 24 are connected via one or more conduits shown collectively in FIG. 1 at 30 to the bearings 26 and 28. Consequently, whenever the shaft 10 is rotating, fuel from the inlet 16 will have it's pressure elevated and provided to the bearings 26 and 28.

It will be immediately recognized that the use of fuel at the bearings 26 and 28 makes use of the lubricity of the fluid to lubricate the pump so that the same is self-lubricating. Furthermore, as the discharge pressure of the impellers 22 and 24 will increase proportional to rotational speed of the pump, it will be appreciated that the bearings 26 and 28 operate at ever increasing pressures to provide excellent journalling of the shaft 10 as higher and higher rotational speeds are encountered. The pump of the present invention is ideally suited for use in a fuel pumping system such as that disclosed in the commonly assigned application of Cygnor, et al., Ser. No. 970,651, filed Nov. 14, 1997, the entire disclosure of which is herein incorporated by reference.

Turning now to FIGS. 2–5, inclusive, the pump will be described in greater detail.

The inducer impeller 18 is located within a pumping cavity 40 within the housing 14 and includes an outlet volute 42 in surrounding relation to the cavity 40. Typically, the impeller 18 will have a helical configuration such as that disclosed in the commonly assigned U.S. Pat. No. 5,061,151 issued Oct. 29, 1991 to Steiger, the entire disclosure of which is herein incorporated by reference.

From the volute 42, fuel that has had it's pressure increased by the impeller is provided to inlet cavities 44 in side plates 46 that define a pump cavity 48 for the regenerative pump impeller 22. The configuration of these components may be generally as disclosed in commonly assigned U.S. Pat. No. 5,096,386 issued Mar. 17, 1992 to Kassel and U.S. Pat. No. 5,265,996 issued Nov. 30, 1993 to Westhoff, et al. The entire disclosures of both such patents are herein incorporated by reference.

The regenerative pump thus defined includes an outlet 50 which is connected to two peripheral channels 52 formed in the side plates 46. Referring to FIG. 1, the outlet 50 is connected to the conduit 30 as mentioned previously.

The centrifugal volute impeller 24 is located within a chamber 60 within the housing 14. It discharges fuel radially outwardly through a diffuser 62 to a peripheral volute 64 of conventional construction. The volute 64 serves as the outlet for the centrifugal volute pump thus defined and is also connected to the conduit 30. Thus, both the regenerative pump and the centrifugal volute pump discharge to the conduit 30.

An inlet to the chamber 60 containing the impeller 24 is illustrated at 66 and typically will be connected to the volute 42 of the inducer impeller 18.

The inducer impeller 18, the regenerative pump impeller 22, and the centrifugal volute pump impeller 24 are mounted on the shaft 10 which is to say, are all mounted on a single shaft which extends through the pumping cavities 40, 48, 60. Located between the impellers 22 and 24 is a bearing block 70 having a cylindrical interior bore 72 which snuggly receives the shaft 10. A similar bearing block 76 with an interior bore 78 is located to the side of the impeller 24 remote from the impeller 22, that is, adjacent the end of the shaft 10 that is connected to the turbine 12. Again, the shaft 10 is snuggly received within the bearing block 76.

Figure 3:
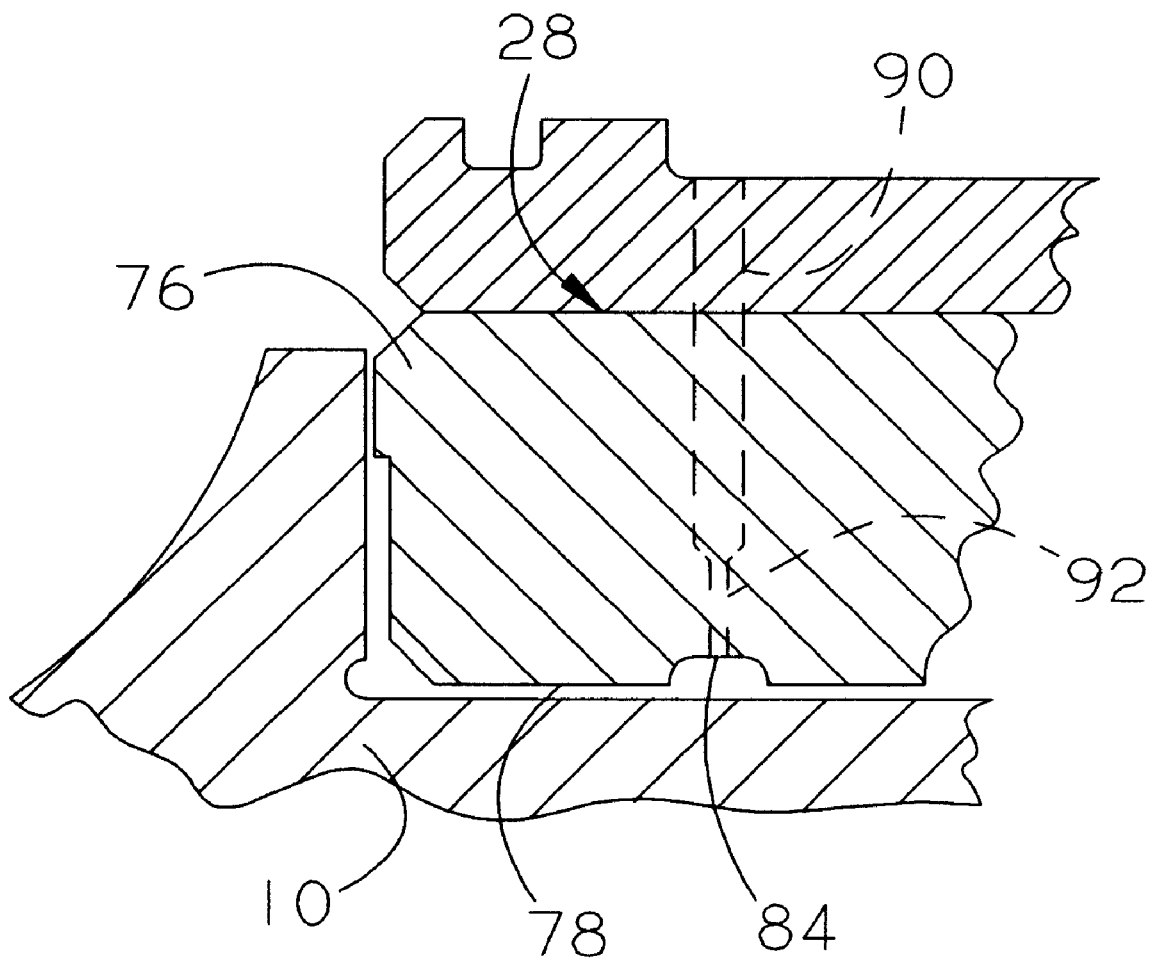
FIG. 3 is an enlarged, fragmentary sectional view of a bearing used in the pump.

Each bearing block 72, 76, includes two rows of equally angularly spaced, pockets 84. One such row is given the reference numeral 80 while the other is given the reference numeral 82. Referring to FIG. 3, one of the pockets 84 is illustrated and it will be seen to be formed in the interior of the bore 78 of the bearing block 76. The same opens radially inwardly toward the shaft 10 and a passage 90 extends to each of the pockets 84. Each of the passages 90 is connected to the conduit 30 so as to receive fuel under discharge pressure from either the impeller 22 or the impeller 24. As can be seen in FIG. 3, where the passage 90 connects to the pocket 84, it is of narrowed diameter to form a flow restriction 92.

Figure 4:
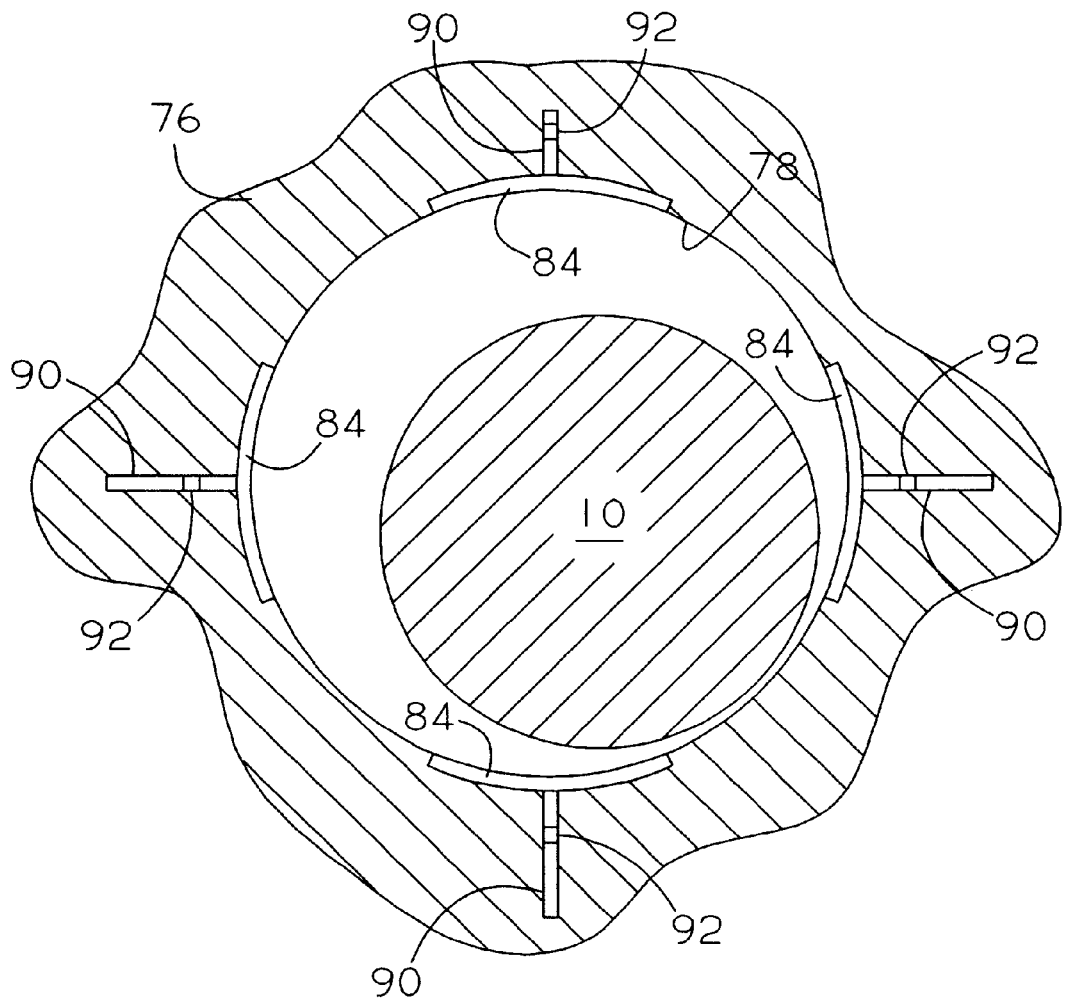
FIG. 4 is a somewhat schematic, exaggerated sectional view of the bearing.
Figure 5:
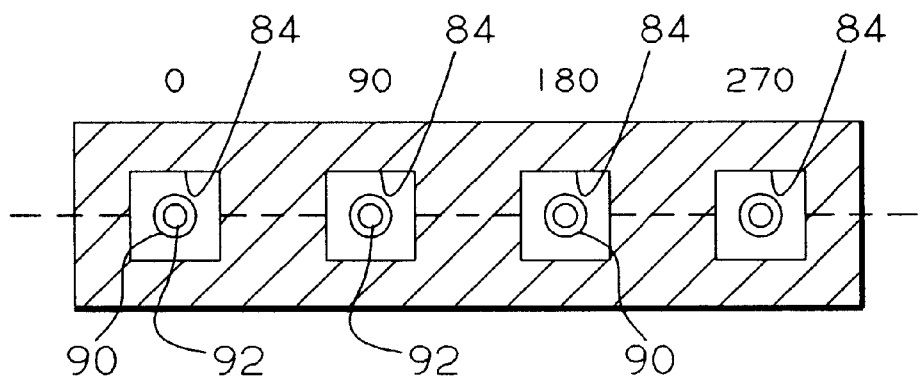
FIG. 5 is a developed view of part of the bearing.

Referring to FIGS. 4 and 5, in a preferred embodiment of the invention, each of the rows 80 and 82 include four equally angularly spaced pockets 84. As seen in FIG. 5, the pockets 84 are spaced on 90° centers and are generally rectangular in configuration.

In operation, if the shaft 10 tends to move off of the center of the bore 78 as illustrated in FIG. 4, it will tend to "crowd" two of the pockets 84, as shown in FIG. 4, the lowermost and rightmost pockets. That is to say, the exterior surface of the shaft 10 tends to occlude the lowermost and rightmost pockets 84, reducing the flow of fuel through their associated passages 90. As a consequence, there will be very little pressure drop across the restriction 92 associated with such pockets and the pressure against the shaft 10 at such locations will be high.

On the other hand, as the shaft 10 has moved away from the uppermost and leftmost ones of the pockets 84, they are relatively unblocked by this surface of the shaft 10 such that substantial fuel flow may occur through the same. As a result, there will be a substantial pressure drop across their associated restrictions 92 and pressure will be relatively low on the upper left hand side of the shaft 10. Consequently, the higher pressure at the lower right hand side of the shaft 10 will tend to center the shaft 10 within the bore 78 with a consequence that the shaft 10 will rotate on a film of fuel without making wear inducing contact with the bearing block 76.

Importantly, because the pockets 84 are provided with fuel at the pressure of the outlets of the two pumps, because pump outlet pressure is proportional to the square of the rotational speed of the shaft 10, as speed increases, and the avoidance of wear inducing contact with the block 76 becomes increasingly critical, the centering pressures available rapidly increase to assure positive centering of the shaft 10 within the bore 78 to avoid wear.

It will therefore be appreciated that a pump made according to the invention provides an ideal fuel pump operating as a centrifugal pump to provide the advantages associated therewith, particularly when employed with modern aircraft engines. That is to say, the volume and weight advantages of centrifugal fuel pumps are realized in a pump of the present invention.

Importantly, the present invention further is self-lubricating, using the pumped fluid, fuel, to provide lubrication at the bearings 26, 28. As a consequence, complicated schemes heretofore required to separate lubricating oil streams from fuel streams, including their many seals, drain cavities and the resulting relatively large overhung moments are all eliminated.

We claim:

1. A high speed centrifugal fuel pump for use in aircraft powered by turbine engines, comprising:

a housing including a pumping cavity;

a rotatable shaft extending through said cavity;

an inlet to said cavity;

an outlet from said cavity;

an impeller carried by said shaft and rotatable therewith within said cavity to pump fluid from said inlet to said outlet;

a turbine engine connected to said shaft for driving said shaft at rotational speeds typically in the range of 25,000 to 40,000 RPM; and a bearing in said housing for journalling said shaft for rotation and comprising a bore snuggly receiving said shaft and having a generally cylindrical surface facing said shaft; a plurality of angularly spaced pockets in said surface, ports connecting said outlet to each of said pockets, and a flow restriction between each pocket and said ports.

2. The high speed centrifugal fuel pump of claim 1 wherein there are two rows of said pockets, said rows being axially spaced, the pockets in each row being equally angularly spaced.

3. The high speed centrifugal fuel pump of claim 1 wherein said pockets are angularly spaced 90°.

4. The high speed centrifugal fuel pump of claim 1 wherein said housing includes at least two pumping cavities and said rotatable shaft is a single shaft extending through both said cavities, there further being two said impellers, one in each cavity and said bearing is located between said cavities.

5. A high speed centrifugal fuel pump adapted to be lubricated by the fuel being pumped and comprising:

a housing having two axially spaced pumping cavities, a first of the cavities having an axial inlet and a peripheral volute provided with an outlet, a second of the cavities having side walls with generally peripheral channels, including an inlet and an outlet;

a first impeller in said first cavity and defining therewith a centrifugal volute pump;

a second impeller in said second cavity and defining therewith a regenerative pump;

a rotatable shaft in said housing and mounting said impellers for rotation in their respective cavities;

a fuel film bearing disposed in said housing between said cavities, said fuel film bearing including a bore through which said rotatable shaft extends, and at least one row of angularly spaced pockets opening toward said shaft in partial surrounding relation thereto; and port(s) connecting at least one of said outlets to each of said pockets.

6. The high speed centrifugal fuel pump of claim 5 further including a third cavity in said housing and an inducer impeller in said third cavity, said shaft having a free end extending to said third cavity and mounting said inducer impeller for rotation therein.

7. The high speed centrifugal fuel pump of claim 6 further including a second of said bearings, said second bearing being in said housing and journalling said shaft at a location to the side of both said first and second impellers remote from said inducer impeller.

8. The high speed centrifugal fuel pump of claim 7 wherein the bearing disposed between said first and second impeller includes at least two axially spaced rows of said pockets.

9. A high speed self-lubricating fuel pump operable at rotational speeds in excess of 10,000 RPM, comprising:

a pump housing including a cavity;

an inlet to said cavity;

an outlet from said cavity;

a rotatable shaft in said housing and extending through said cavity;

a pump impeller mounted on said shaft to be rotatable therewith and operable to pump fuel within said cavity from said inlet to said outlet;

a bore within said housing adjacent said cavity and snuggly receiving said shaft; a plurality of angularly spaced pockets at the interface of said bore and said shaft; and ports connecting said outlet to each of said pockets to deliver fuel under pressure thereto when said impeller is rotating to thereby journal said shaft.

10. The high speed self-lubricating fuel pump of claim 9 wherein said pockets are in said housing and open radially inwardly toward said shaft.

11. The high speed self-lubricating fuel pump of claim 9 further including a flow restriction for each of said pockets and each located in said connecting means in close proximity to the associated pocket.

12. The high speed self-lubricating fuel pump of claim 9 wherein in said pockets are in multiple, axially spaced rows.

* * * * *